Figure 1:
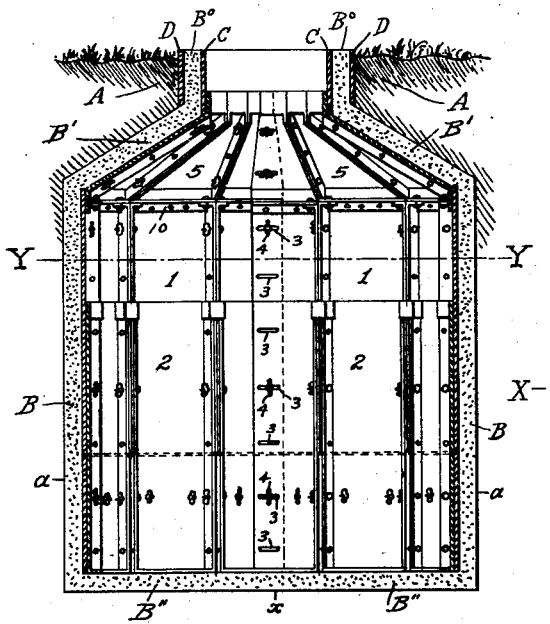

No. 733,810. PATENTED JULY 14, 1903.
N. BROWN.
ADJUSTABLE CISTERN FORMING DEVICE.
APPLICATION FILED FEB. 13, 1903.
NO MODEL.

Witnesses,
S. C. Duvall.
R. E. Randle.

Inventor,
NED BROWN,
by his attorney,
Robert W. Randle.

THE NORRIS PETERS CO., PHOTO-LITHO., WASHINGTON, D. C.

No. 733,810. Patented July 14, 1903.

UNITED STATES PATENT OFFICE.

NED BROWN, OF PORTLAND, INDIANA.

ADJUSTABLE CISTERN-FORMING DEVICE.

SPECIFICATION forming part of Letters Patent No. 733,810, dated July 14, 1903.

Application filed February 13, 1903. Serial No. 143,181. (No model.)

*To all whom it may concern:*

Be it known that I, NED BROWN, a citizen of the United States, residing in the city of Portland, in the county of Jay and State of Indiana, have invented new and useful Improvements in Adjustable Cistern-Forming Devices, of which the following is a specification, which, taken in connection with the accompanying drawings, forming a part thereof, is sufficiently clear and concise as to enable others skilled in the art to which it appertains to make and use the same.

My present invention relates to the formation of cisterns or the like to be formed of cement, concrete, or other impervious constituent capable of being prepared in a liquid or plastic state and of quickly hardening or solidifying to maintain its predetermined form by means of a specially-constructed apparatus or device specifically constructed to produce cisterns of a uniform circumferential diameter with varying predetermined internal capacities.

A still further object is to provide a mechanism of the character stated composed of a minimum of component parts of resistant material to produce commensurate results for the better adaptation of the labor to be performed in assembling, disassembling, and transportation of its constituent elements, the mitigation of the labor of the personnel, and the resultant production of a better and higher grade of the finished product.

Another object of my invention is to provide a device whereby cisterns varying greatly in capacity may be formed with a single apparatus and without varying the circumference either of the cistern or the apparatus.

Another object is the provision of an apparatus for forming cisterns or the like formed of a plurality of vertical extensible contacting ribs or sections arranged circularly and parallel with each other with means for connecting said ribs in their equipollent relations to each other and to the desired extension, means for partially covering the top by a similar but angular construction to form the dome of the cistern, and means for removing the mechanical parts after the cistern has been formed, and, finally, another potent object is to provide an apparatus for forming cisterns composed of a minimum of parts which will be simple in character, compact in form and construction, easily operated and maintained, and which can be manufactured and sold at a comparatively low price.

Other objects and advantages of my invention will appear from the following specification and from the drawings forming a part thereof.

My invention consists in a cistern-forming mechanism embodying certain new and useful features and details of construction and relative disposition of the several parts, substantially as particularly described otherwhere in this specification, illustrated in the accompanying drawings, and correlated in the appended claims.

In detail the invention relates to a cistern-forming mechanism, substantially as shown in the accompanying drawings, in which—

Figure 2:
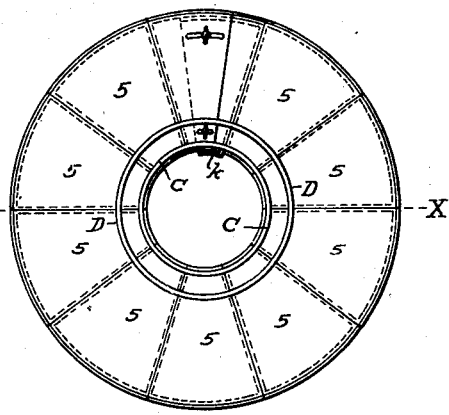
Figure 3:
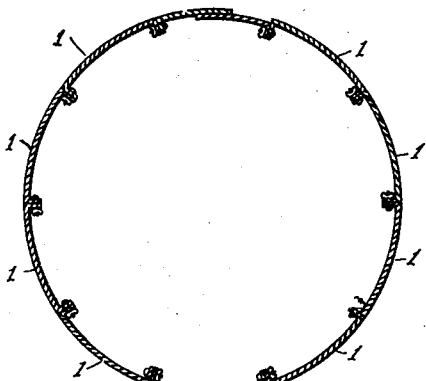
Figure 4:
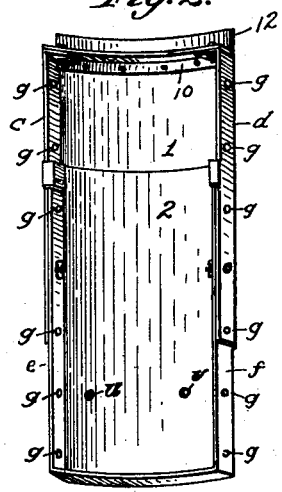
Figures 5, 6:
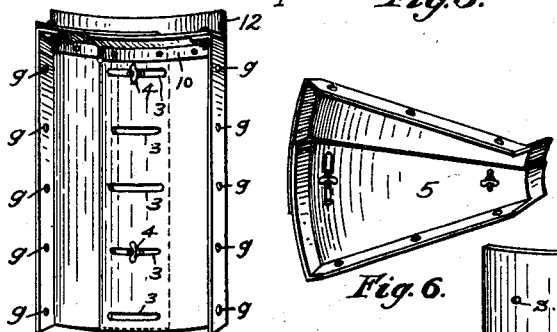
Figure 8:
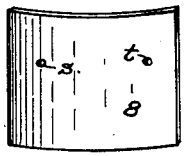
Figure 7:
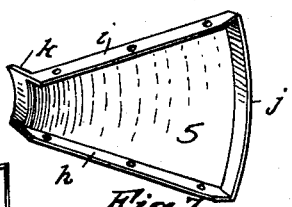

Figure 1 is a central vertical section through my invention, taken on the line X X of Fig. 2. Fig. 2 is a top plan of my invention. Fig. 3 shows a horizontal cross-section taken on the line Y Y of Fig. 1. Fig. 4 is a perspective view of one of the extensible side ribs of my invention. Fig. 5 is a view of the single four-part rib, which in addition to being extensible vertically is also extensible laterally. Fig. 6 shows the single extensible triangular top member in perspective. Fig. 7 shows one of the triangular top sections in perspective, and Fig. 8 is a detail of one of the plates for filling out the continuity of the side ribs in order to make the outside diameter of the device the same at both top and bottom.

Similar indices refer to and denote like parts throughout the several views of the drawings.

The detail construction of the invention, which I will now state as briefly and compactly as I may, is as follows:

In the drawings, A denotes the earth into which I propose to form a cistern. Into the earth A, I propose to excavate a circumferentially-round hole of a diameter represented between the lines $a\ a$ of Fig. 1 to approximately the depth shown by the line $x$. Into the opening thus formed I will construct a cistern of cement or the like, of which the letter B represents the perpendicular walls. The sloping top or dome is represented by B', the bottom by B'', and the neck by B°.

My device for forming the cistern consists, primarily, of a plurality of two-part ribs formed extensible, each of said ribs consisting of the two members 1 and 2, with inturned edges c d on the member 1 and e f on the member 2. The members 1 and 2 are approximately of the same size, the member 1 being slightly wider to allow them to nest together, as shown in Fig. 4. Across the inner faces of each of the upper members of the ribs is secured an angle-flange 10, forming a shelf or bracket which extends in the same distance as do the inturned edges c d, and the upper end of the rib extends upward therefrom, as shown, forming the projection 12. At frequent distances apart in the edges c d and e f are small holes g, through which thumb-bolts may be passed to secure the members 1 and 2 at the desired extension. Said holes also provide means for securing the different ribs together in the form of a drum by passing thumb-bolts through the contacting flanges. The ribs being formed as stated are set up perpendicular on the bottom of said hole formed in the earth, forming a drum, the adjacent flanges of the ribs being secured by bolts passing through the holes g, the length of the ribs being predetermined and secured by passing thumb-bolts through opposite adjoining holes in the flanges of the adjoining ribs, substantially as shown in the drawings. All of the ribs are constructed substantially as that shown in Fig. 4, except one, which would be a four-part rib, substantially as that shown in Fig. 5, which is extensible both vertically and laterally, the lateral extension being accomplished by forming both the upper and lower members of the rib into two parts overlapping each other, with horizontal oppositely-disposed slots 3, adapted to receive thumb-screws 4, by which it is apparent that the parts of each member may be moved laterally and secured in the position desired by means of the bolts 4. When constructed as shown in Fig. 5, this rib may then be placed in position and secured to the other ribs, thus completing the circle or drum. Fig. 5 shows only the upper member of the rib, it being understood that the lower member is of substantially the same construction. In Fig. 8 is shown a plate of a size approximately that of the offset portion of each of the ribs below the end of the upper member 1, in which place these ribs 8 may be secured by bolts passing through holes s and t in the plate 8 and through the opposite holes u and v, formed through the lower members 2, thus preserving the continuity of the upper members 1 to form the outside of the rib straight from top to bottom. Several sets of the plates 8 should be kept at hand varying in height to meet the various points of extension within the limits of the ribs. The sides of the device being set up and secured together as stated, I next form the top, which is composed of sections, as shown in Fig. 7 by the numeral 5, whose number corresponds with the number of said ribs and are triangular in shape, with downwardly-bent edges h and i, similar to those on the sides of the ribs, and an outer edge is an upturned flange j, forming the edge, which is adapted to rest on the flanges 10 of the members 1 of the ribs, and an inner upturned flange k, forming the throat of the device. One of said triangular top sections I form extensible laterally, as shown in Fig. 7, in substantially the same manner as one of the side sections is formed by making this section into two overlapping portions with opposite lateral slots therethrough, through which thumb-bolts may be inserted to secure the two parts at the desired extension. The several dome members 5 are then placed in position on top of the ribs and secured together by thumb-bolts passing through opposite holes in the adjoining edges of the flanges, as shown in Fig. 1. I then place a ring C around the throat formed by the flanges k, which extends up to about the level of the surface of the earth. The entire device being now assembled as stated, I prepare a conglomerate of cement or the like by the addition of water or other fluid into proper consistency, with which I fill the space between the ribs of my device and the earth and extending the same over the dome to the throat thereof. I then place the ring D, somewhat larger and reaching to the same height as the ring C, upon the top thus formed, and around said ring C and then between the rings C and D, I fill in with the same plastic material as stated, forming the neck of the cistern. As soon as the cement or the like has become set or hardened I remove the rings C and D and then enter the cistern through the neck and remove the bolts which connect the various parts of the device. The extensible sections shown in Figs. 6 and 5 are first removed by loosening the bolts which hold the parts in lateral alinement, and the other portions are then removed in reverse order from that in which they were inserted, and the parts can then be taken out through the neck of the cistern. After the device has been removed from the cistern I then cover the bottom of the cistern with a layer of the same plastic material as used in the sides and top, forming the bottom B'' of the cistern, substantially as shown.

Having now fully shown and described my invention and the best method for its construction to me known at this time, what I claim as new, and desire to secure by Letters Patent of the United States, is—

1. In a cistern-forming device the combination, a plurality of vertically-extensible ribs arranged circumferentially in contact with each other, with means for securing said ribs together and in their extended positions by bolts, one of said ribs being formed extensible both vertically and laterally with means for securing it in the position desired, the triangular top members forming a dome, and one of said top members formed extensible, all substantially as shown and described and for the purposes set forth.

2. In a cistern-forming device the combination, a plurality of vertically-extensible ribs arranged circularly on end contacting with each other with means for securing their contacting edges together and in their extended position, a plate adapted to be secured to the lower portion of each rib to fill out the continuity of the overlapping portions thereof, one of said ribs formed extensible both vertically and horizontally, and the triangular-shaped members forming a dome, all substantially as shown and described and for the purposes set forth.

3. In a cistern-forming device the combination, a plurality of two-part extensible ribs with inturned edges with openings through said edges, said ribs adapted to be set up vertically with the edges of each rib contacting with a similar edge of the next rib thus forming a drum with the contacting edges secured together by bolts or the like operative from the interior of the drum thus formed, one of said ribs being also extensible laterally forming a four-part rib with means for securing the part at the desired extension, a circular top formed of triangular sections resting on the upper ends of said ribs, all substantially as shown and described and for the purposes set forth.

4. In combination with a circular cavity formed in the earth, a cistern-forming device assembled therein whose diameter is smaller than the diameter of said cavity, said device consisting of a plurality of two-part and a single four-part extensible ribs adapted to be secured together and at the desired extension by thumb-bolts or the like forming a drum, said thumb-bolts being insertible and removable from within the drum thus formed, a circular separable dome-top covering said parts, one of the sections of said dome-top being extensible, all substantially as shown and described.

In testimony whereof I have hereunto signed my name to this specification in the presence of two subscribing witnesses.

NED BROWN.

Witnesses:
GEO. W. BERGMAN,
E. E. MCGRIFF.